(12) United States Patent
Murata

(10) Patent No.: US 7,961,179 B2
(45) Date of Patent: Jun. 14, 2011

(54) INTEGRATED DRIVING APPARATUS FOR DISPLAY APPARATUS

(75) Inventor: Tsutomu Murata, Gifu (JP)

(73) Assignees: Sanyo Electric Co., Ltd. (JP); Sanyo Semiconductor Co., Ltd. (JP)

( * ) Notice: Subject to any disclaimer, the term of this patent is extended or adjusted under 35 U.S.C. 154(b) by 773 days.

(21) Appl. No.: 11/863,844

(22) Filed: Sep. 28, 2007

(65) Prior Publication Data

US 2008/0079702 A1   Apr. 3, 2008

(30) Foreign Application Priority Data

Sep. 28, 2006   (JP) .............................. JP2006-263960

(51) Int. Cl.
G09G 5/00   (2006.01)
(52) U.S. Cl. ........................... 345/205; 345/204; 345/87
(58) Field of Classification Search ............ 345/55–100, 345/204–214
See application file for complete search history.

(56) References Cited

U.S. PATENT DOCUMENTS

| | | | |
|---|---|---|---|
| 7,196,701 | B2 | 3/2007 | Tsutsui et al. |
| 2003/0067434 | A1* | 4/2003 | Haga et al. .................... 345/98 |
| 2004/0070589 | A1* | 4/2004 | Morita et al. .................. 345/690 |
| 2007/0013635 | A1* | 1/2007 | Ito et al. ........................ 345/98 |
| 2007/0057896 | A1* | 3/2007 | Natori et al. ................... 345/98 |

FOREIGN PATENT DOCUMENTS

JP   2001-282164   10/2001

* cited by examiner

*Primary Examiner* — Nitin Patel
(74) *Attorney, Agent, or Firm* — Cantor Colburn LLP

(57) ABSTRACT

An integrated driving apparatus having an elongated shape mounted at a peripheral portion of a display apparatus comprising a display section on a panel substrate comprises a logic section, a power supply circuit section, and a D/A converter. The logic section comprises a digital display data processor and a timing signal generator which generates a timing control signal necessary for the display apparatus and the D/A converter converts digital display data obtained by the digital display data processor into analog data. The power supply circuit section generates a power supply voltage used in the display apparatus using a signal from the timing signal generator. The power supply circuit section and the D/A converter are provided on left and right of the logic section with the logic section therebetween so that the power supply circuit section and the D/A converter are placed adjacent to the logic section along a long side direction of the elongated shape of the integrated driving apparatus.

4 Claims, 5 Drawing Sheets

US 7,961,179 B2

INTEGRATED DRIVING APPARATUS FOR DISPLAY APPARATUS

CROSS-REFERENCE TO RELATED APPLICATIONS

The entire disclosure of Japanese Patent Application No. 2006-263960 including specification, claims, drawings, and abstract is incorporated herein by reference.

BACKGROUND OF THE INVENTION

1. Field of the Invention

The present invention relates to a layout of an integrated driving circuit for driving a display apparatus.

2. Description of the Related Art

As a representative example of a flat display apparatus, for example, a liquid crystal display apparatus is known, has characteristics such as thin thickness and low power consumption, and is widely in use as a monitor for a mobile phone, a monitor for a personal digital assistant, a monitor for a computer, a monitor for a television, etc.

In such a liquid crystal display apparatus, an active matrix display apparatus in which a switching element such as thin film transistor (herein after referred to as "TFT") is provided as a circuit in each pixel and display is controlled for each pixel can realize a high resolution, high quality display, and the use of the active matrix display apparatus in various devices is currently expanding.

FIG. 1 conceptually shows an active matrix liquid crystal display apparatus which is proposed, for example, in JPA2001-282164 (hereinafter referred to as "Reference Document 1"). The liquid crystal display apparatus (LCD) comprises a liquid crystal display panel (hereinafter referred to as "LCD panel") 400 in which liquid crystal is sealed between a pair of substrates, a driving circuit 500 which generates a signal for driving the LCD panel 400, and a power supply circuit 600.

The LCD panel 400 is an active matrix LCD panel in which a TFT is provided as a switching element in each pixel. At a peripheral portion of a display section of the panel, a vertical direction driver which sequentially controls a gate line and a horizontal direction driver which supplies display data to a data line at a predetermined timing are formed.

The driving circuit 500 comprises a timing signal generator 510, a display data processor 520, and a digital-to-analog (D/A) converter 580. The timing signal generator 510 generates various timing signals based on various signals supplied from outside such as synchronization signals (Hsync, Vsync), and a clock signal (DOTCLK). The display data processor 520 is a circuit which processes a color video signal from outside. The display data processor 520 converts, for example, a serial digital video signal supplied from outside into a parallel signal, executes a signal process such as γ correction, and generates display data suitable for realizing a display on the LCD panel 400.

A resistor-string type converter may be used as the D/A converter 580. The D/A converter 580 converts a digital display data signal processed by the display data processor 520 into analog display data for each of R, G, and B, and the obtained analog display data is supplied to the data line of the LCD panel 400 through an amplifier or the like.

The power supply circuit 600 comprises a charge-pump circuit or the like, and generates a plurality of power supplies (power supply voltages) necessary in the display apparatus using a reference voltage supplied from outside and based on a power supply clock signal generated by the timing signal generator 510 of a logic section. The power supply circuit 600 is used not only for the power supply of the LCD panel 400, but also for the power supply of the D/A converter 580 of the driving circuit 500.

In the display apparatus of FIG. 1, the driving circuit 500 and the power supply circuit 600 are independently integrated as external circuits of the LCD panel. In order to further improve the functions of the display panel or reduce the space for the overall device including the display apparatus, attempts have been made to integrate the driving circuit 500 and the power supply circuit 600 as a driving apparatus for the display apparatus and mount the integrated driving circuit on the panel 400 using, for example, a COG (Chip On Glass) technology.

In order to mount such an integrated driving circuit on the LCD panel 400, the integrated driving circuit must be placed at a peripheral portion of the panel other than the display section in order to not reduce an area of the display section. Therefore, the integrated driving circuit must be formed in an elongated shape along a row direction (horizontal scan direction) or a column direction (vertical scan direction) of the display section.

FIG. 2 shows a layout of the elongated-shaped integrated driving circuit 700. From the viewpoint of a layout efficiency, circuit elements having similar functions are generally formed at positions close to each other, and, thus, the timing signal generator 510 and the display data processor 520 of FIG. 1 which can be formed using logic circuit elements are collectively placed as a logic section 501. In addition, the power supply circuit 600 comprising a capacitor and a switch or the like (in the case of a charge-pump type power supply circuit) and the D/A converter 580 comprising a divided resistor and a switch or the like (in the case of resistor-string type D/A converter) are formed in collective regions.

A power supply clock signal for generating a power supply must be supplied from the logic section 501 to the power supply circuit (DC/DC converter) 600, and, thus, it is desirable that the logic section 501 and the power supply circuit 600 be placed close to each other. In addition, because the analog display data to be supplied to the LCD panel 400 significantly affects the display quality, a small variation in the voltage is required for the analog display data. In addition, a large amplitude is required for the analog display data because of an operation characteristic or the like of the TFT in the LCD panel 400. Thus, in order to minimize the voltage drop, the power supply circuit 600 and the D/A converter 580 must be placed as close to each other as possible. Therefore, in the integrated driving circuit 700 of the related art, as shown in FIG. 2, the power supply circuit 600 is placed at a center portion along a longitudinal direction of the integrated driving circuit 700 having an elongated shape, and the logic section 501 and the D/A converter 580 are placed in contact with the power supply circuit 600 at left and right end regions of the integrated driving circuit 700.

With the circuit layout of the related art as shown in FIG. 2, a line distance between the logic section 501 and the power supply circuit 600 and a line distance between the power supply circuit 600 and the D/A converter circuit section 580 can be minimized. However, a line from the logic section 501 to the D/A converter circuit section 580 must pass through a formation region of the power supply circuit 600. Here, a large number of data lines corresponding at least to a number of bits of the digital display data and a number of colors are required from the logic section 501 to the D/A converter circuit section 580. In other words, a very large number of data lines must be provided in the formation region of the power supply circuit 600 in parallel to each other, and, thus, the area along the line width direction cannot be easily reduced.

In addition, because it is required to output necessary signals to the power supply circuit 600 and the D/A converter circuit section 580 with a minimum line length, all output sections must be placed in a region of the logic section 501 at a side near the power supply circuit 600. Thus, the output sections are unevenly distributed on one side of the logic section 501, and, it is difficult to improve the layout efficiency in the logic section 501.

On the other hand, because the integrated driving circuit 700 is mounted on the panel, the integrated driving circuit 700 must be designed to fit in a very limited region with a narrow width in a peripheral portion of the display section. However, the layout efficiency of the driving circuit 700 of the related art is low, and it is difficult to reduce the width along the short side direction, which makes it difficult to reduce the size of the panel 400.

SUMMARY OF THE INVENTION

An advantage of the present invention is that a layout efficiency of an integrated driving circuit having an elongated shape is improved.

According to one aspect of the present invention, there is provided an integrated driving apparatus for a display apparatus having a display section in which a plurality of pixels are arranged in a matrix form on a panel substrate, the integrated driving apparatus comprising a logic section which comprises a digital display data processor which processes digital display data and a timing signal generator which generates a timing control signal necessary for the display apparatus based on a timing signal from outside, and having a logic circuit element, a digital-to-analog converter which converts digital display data obtained by the digital display data processor into analog data, and a power supply circuit section which generates a power supply voltage used in the display apparatus using a signal from the timing signal generator, wherein the integrated driving apparatus has an elongated shape extending along a row direction or a column direction of the display section so that the integrated driving apparatus can be mounted on a peripheral portion of the display section on the panel substrate, and the power supply circuit section and the digital-to-analog converter are provided on left and right of the logic section with the logic section therebetween so that the power supply circuit section and the digital-to-analog converter are placed adjacent to the logic section along a long side direction of the elongated shape.

According to another aspect of the present invention, it is preferable that, in the integrated driving apparatus, at least a clock line for supplying a power supply clock signal for generating the power supply voltage is provided between the timing signal generator and the power supply circuit section, at least a plurality of data lines for supplying the digital display data to the digital-to-analog converter are provided between the digital display data processor and the digital-to-analog converter, and the digital display data processor, the timing signal generator, and the digital-to-analog converter operate with a supply of a power supply from an external power supply.

According to another aspect of the present invention, it is preferable that, in the integrated driving apparatus, the display apparatus is an active matrix display apparatus having, in each of the plurality of pixels, a transistor element which controls a display element, and the analog display data from the digital-to-analog converter is supplied to a data line provided in the display section.

According to various aspect of the present invention, it is not necessary to provide a data line passing through the power supply circuit section from the logic circuit section to the digital-to-analog converter. As a consequence, a line area for such a data line is no longer necessary. Thus, it is possible to improve the efficiency of the layout along the short side direction in an integrated driving apparatus which must be formed in an elongated shape and the width along the short side direction can be reduced. In addition, because the unevenness in the layout can be resolved, the overall layout efficiency of the circuit structure can be improved and the size of the overall chip can be reduced.

BRIEF DESCRIPTION OF THE DRAWINGS

A preferred embodiment of the present invention will be described in detail by reference to the drawings, wherein.

DESCRIPTION OF THE PREFERRED EMBODIMENT

A preferred embodiment of the present invention (hereinafter referred to as "embodiment") will now be described with reference to the drawings.

Figure 1:
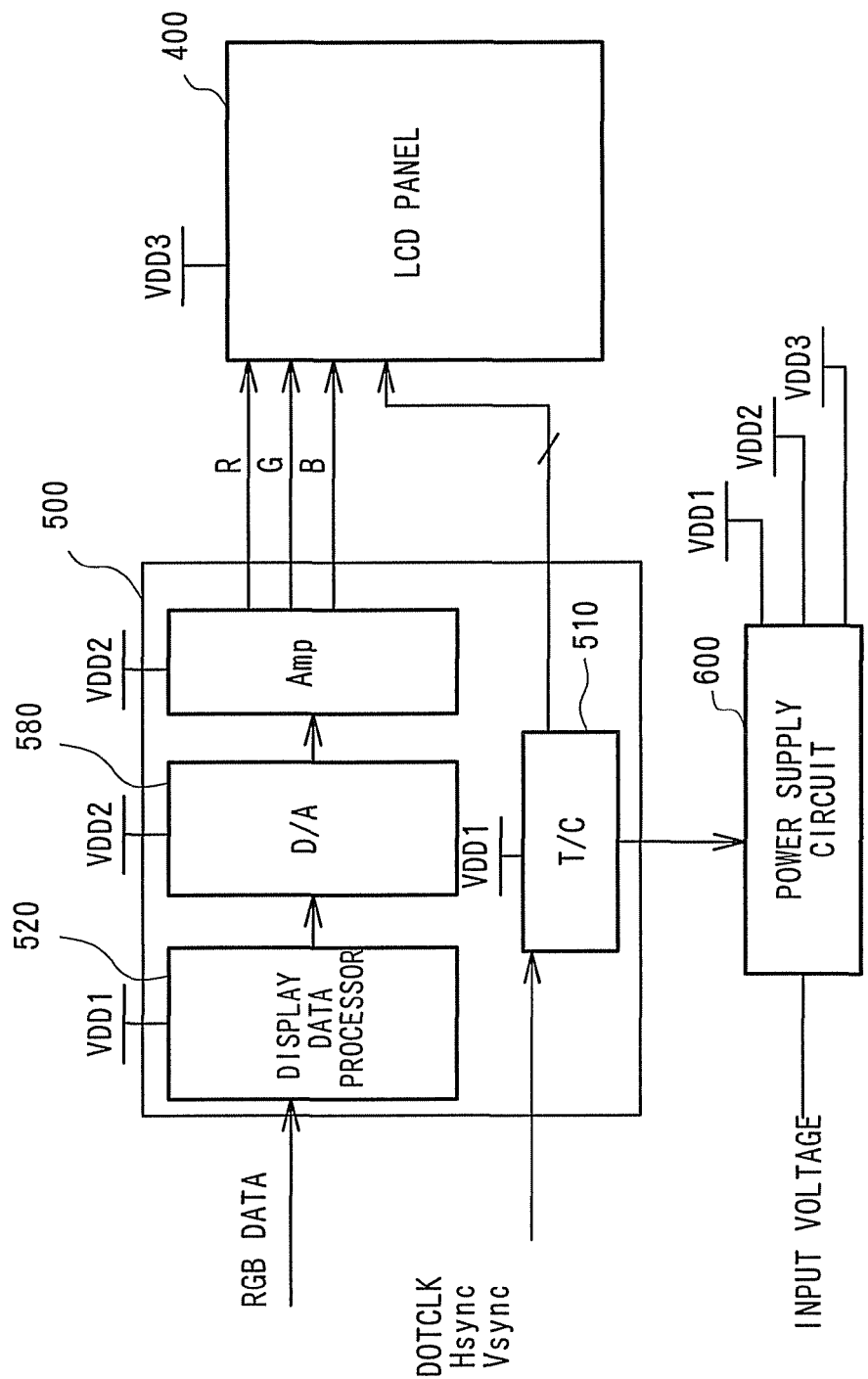
FIG. 1 is a diagram schematically showing a structure of an LCD according to related art.
Figure 2:
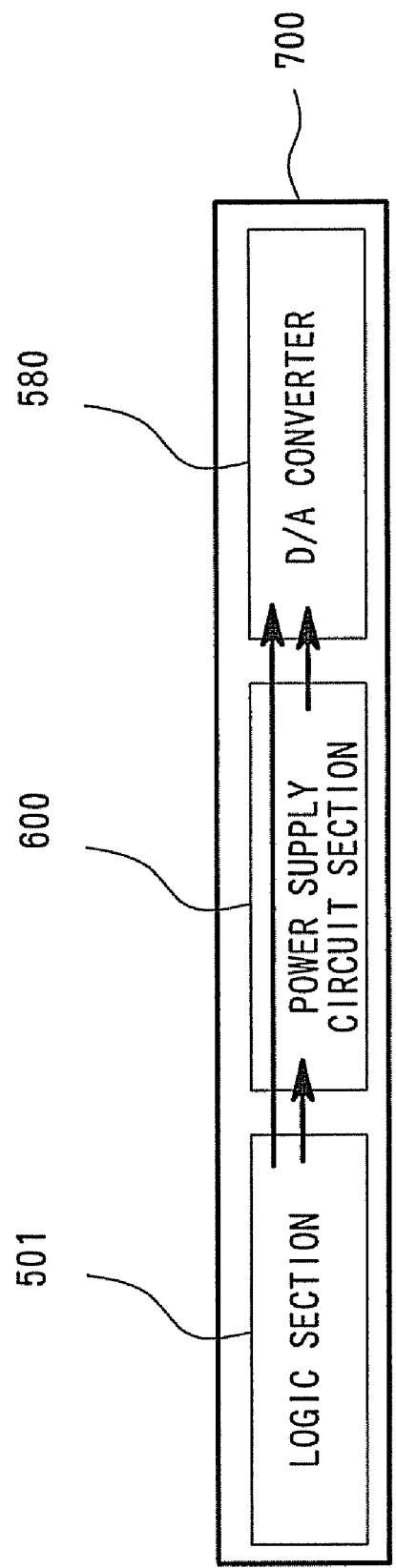
FIG. 2 is a diagram schematically showing a layout of an integrated driving apparatus according to related art.
Figure 3:
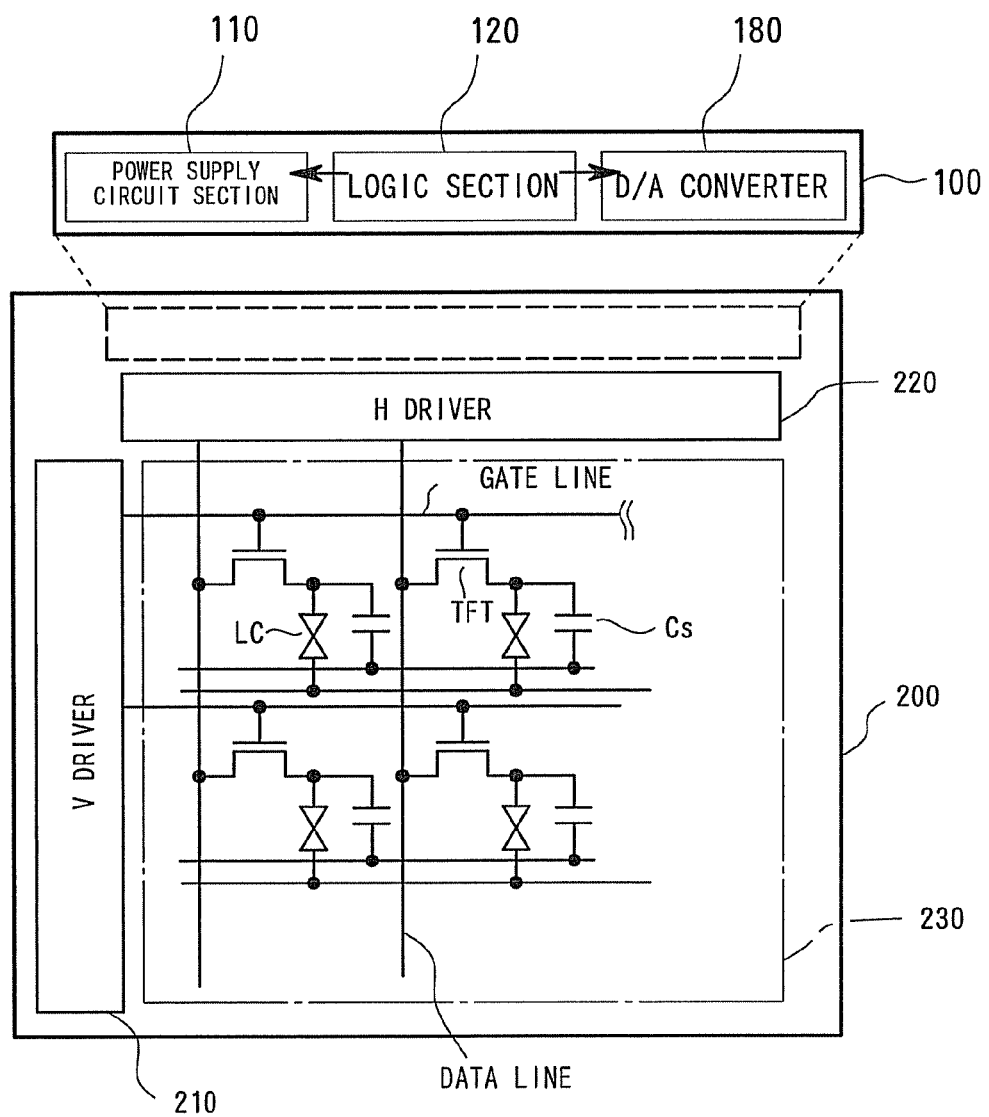
FIG. 3 is a diagram schematically showing a structure of a display apparatus according to a preferred embodiment of the present invention.
Figure 4:
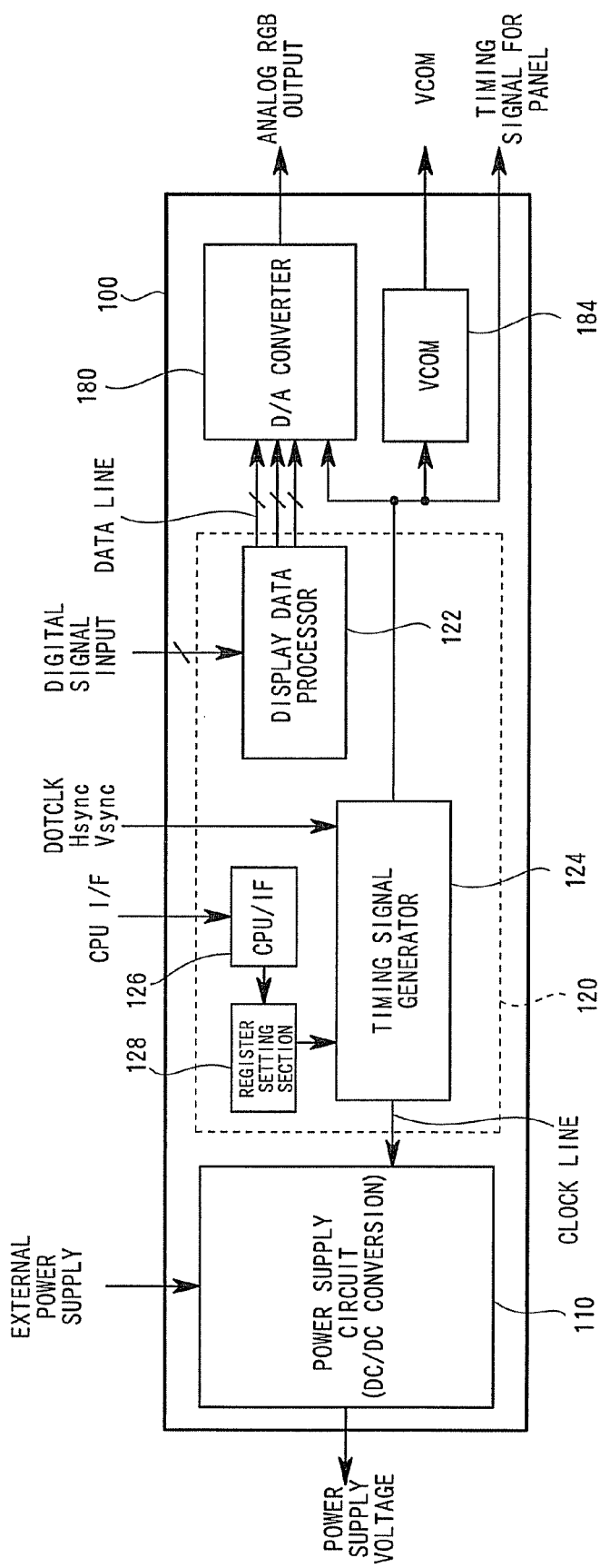
FIG. 4 is a diagram showing an example of a layout of an integrated driving apparatus of FIG. 3.

FIG. 3 schematically shows an overall structure of a display apparatus according to a preferred embodiment of the present invention and FIG. 4 schematically shows a layout of an integrated driving apparatus. The display apparatus is a flat display apparatus such as an LCD, and an active matrix LCD having a TFT as a switching element in each pixel and which executes display control for each pixel will be described as an example.

The display apparatus comprises an LCD panel 200 and an integrated driving apparatus 100 having a circuit structure for driving the LCD panel 200. The LCD panel 200 is formed by affixing a pair of substrates such as glass on each of which an electrode is formed on a side opposing the other substrate, and sealing liquid crystal between the substrates. A pixel is formed at a position in which the electrodes oppose each other with the liquid crystal layer therebetween, and a plurality of such pixels are arranged in a matrix form in a display section 230 of the panel. When a driver circuit having a shift register circuit or the like for driving a pixel circuit such as a pixel TFT is to be built into the panel, a vertical direction driver (V driver) 210 which sequentially controls a gate line and a horizontal direction driver (H driver) 220 which supplies display data to a data line at a predetermined timing are formed on one of the substrates of the panel (on a substrate on which the pixel TFT or the like is formed), at a peripheral portion of the display section 230 as shown in FIG. 3. The V driver 210 sequentially outputs a scan signal (gate signal) which controls ON and OFF states of the pixel TFT of the display section to a gate line extending along a row direction. The H driver 220 controls supply of analog display data, which is supplied from the integrated driving apparatus 100 to be described later, to a data line extending along a column direction. With such a control, a voltage corresponding to analog display data is applied to liquid crystal and a storage capacitor Cs of each pixel through a pixel TFT which is controlled to be switched ON, an orientation of the liquid crystal is controlled for each pixel, and display is realized.

The integrated driving apparatus 100 of the embodiment is mounted at a peripheral portion of the display section 230 of the LCD panel 200 by a COG method and has an elongated shape, for example, along a row direction (horizontal scan direction) of the display section 230. In the integrated driving apparatus 100, a power supply circuit section 110, a logic section 120 which can be formed with a logic circuit element, a D/A converter 180, or the like are integrated as a single chip. In addition, in the present embodiment, the logic section 120 is placed at a center portion along a long side direction of the integrated driving apparatus 100 having the elongated shape, and the power supply circuit section 110 and the D/A converter 180 are provided adjacent to the logic section 120 and at regions on the left and right along the long side direction with the logic section 120 therebetween.

The logic section 120 is primarily constructed as a logic circuit element which can process digital data, and comprises a display data processor 122, a timing signal generator 124, a CPU interface (CPU/IF) 126, and a register setting section 128. The display data processor 122 is a signal processing circuit which processes a color video signal from outside into a display signal suitable for display on the LCD panel. The display data processor 122 converts, for example, a serial digital video signal supplied from the outside into a parallel signal, applies a process such as a matrix conversion and thinning-out according to the type of the signal, execute an image quality adjusting process such as Ycorrection, and outputs the obtained processed R, G, and B digital display data to the D/A converter 180 to be described later.

The timing signal generator 124 generates various timing signals necessary in the V driver 210 and the H driver 220 such as an H direction clock CKH, a V direction clock CKV, a horizontal start signal STH, and a vertical start signal STV based on a dot clock (DOTCLK) and synchronization signals (Hsync, Vsync) supplied from the outside. In addition, the timing signal generator 124 generates a power supply clock signal necessary for generating, in the power supply circuit section 110, a power supply used in the panel. Moreover, because the liquid crystal must be AC driven in the LCD panel 200, the timing signal generator 124 generates a polarity inversion timing signal for periodically inverting a polarity of the display data and supplies the polarity inversion timing signal to the D/A converter 180 and a VCOM output section 184.

The CPU/IF 126 receives an instruction from a CPU or the like (not shown) of the device on which the LCD panel 200 is mounted and analyzes the instruction, and supplies the instruction to the register setting section 128. The register setting section 128 maintains the instruction from the CPU, and supplies a control signal according to the instruction to the timing signal generator 124. The instructions transmitted from the CPU include, for example, an adjustment instruction of a display position on the display panel, a contrast adjustment instruction, or a power save control instruction.

A resister string type converter may be employed for the D/A converter 180, and the D/A converter 180 converts the R, G, and B digital display data signals which are output from the display data processor 122 into R, G, and B analog display data having corresponding voltage values. The obtained analog display data is supplied to the data line of the LCD panel 200 through an amplifier (not shown) provided at an output stage of the integrated driving circuit 100.

The VCOM output section 184 generates a common electrode signal VCOM or the like to be supplied to a common electrode which is placed opposing a pixel electrode, which is individual for each pixel of the LCD panel 200, with the liquid crystal layer therebetween, and outputs the common electrode signal VCOM or the like. In the present embodiment, a driving method is employed in which a polarity of the potential of the common electrode is also periodically inverted. Thus, the VCOM output section 184 receives the polarity inversion signal from the timing signal generator 124 and periodically inverts the polarity of the common electrode signal VCOM. The VCOM output section 184 is provided in a region of the integrated driving apparatus 100 at a side opposite of the power supply circuit section 110 and on a same side as the D/A converter 180, and forms a part of an analog voltage output section (which primarily includes a driver output section to the H driver and V driver) to the LCD panel 200 along with the D/A converter 180.

The power supply circuit section (DC/DC converter) 110 may be constructed from, for example, a charge-pump circuit, a switching regulator, or the like, and generates an ON level and an OFF level of a gate signal and a high voltage (8.5 V, for example) used for a control potential level of the storage capacitor Cs which are necessary in the LCD panel 200, from an external power supply of approximately 3 V using the power supply clock signal from the timing signal generator 124, and supplies the power supply to the panel 200.

In the present embodiment, the integrated driving apparatus 100 having an elongated shape approximately has a structure as described above, and the power supply circuit section 110 and the D/A converter 180 are placed on the left and right of the logic section 120 as described above. In the logic section 120, the display data processor 122 can be placed at a side near the D/A converter 180, and data lines, for example, for supplying R, G, and B digital display signals in units of 10 bits from the processor 122 are provided between the display data processor 122 and the D/A converter 180. In addition, a timing signal line from the timing signal generator 124 is provided.

The timing signal generator 124 can be provided in the logic section 120 on a side near the power supply circuit section 110, and a clock line for supplying a power supply clock signal is provided between the timing signal generator 124 and the power supply circuit section 110.

In the present embodiment, the power supply voltage generated by the power supply circuit section 110 is not used as the power supply of the integrated driving apparatus 100, for example, the power supply of the divided resistor for conversion in the D/A converter, and is only used as the power supply of the LCD panel 200 as described above. Because of this, the line from the power supply circuit section 110 to the D/A converter 180 or the like is not necessary.

As described, in the layout of the integrated driving apparatus 100 according to the present embodiment, by providing the logic section 120 at a center portion along the longitudinal direction and providing the power supply circuit section 110 and the D/A converter 180 at the left and right of the logic section 120, it is possible to form the logic circuit (output section of the display data processor 122), which outputs signals necessary for the D/A converter, in the logic circuit 120 near the D/A converter, and, consequently, a data line can be placed efficiently with a short distance. In addition, a logic circuit which generates signals necessary for the power supply circuit section 110 (output section of the timing signal generator 124) can be provided at a region in the logic section 120 on a side opposite of that of the D/A converter 180, and, consequently, a line connected to the power supply circuit section 110 can also be placed efficiently with a short distance. In this manner, the distances of the lines connecting each section can be shortened and the circuits can be placed efficiently in the logic section 120. Because of this, the area of the logic section 120 can be reduced, and it is no longer necessary to form the digital data line from the logic section through the power supply circuit section to the D/A converter as is done in the apparatus of the related art. Therefore, the layout efficiency of the overall integrated driving apparatus can be improved, the width along the short side direction of the elongate shape can be reduced, and the size of the overall integrated circuit can be reduced.

Figure 5:
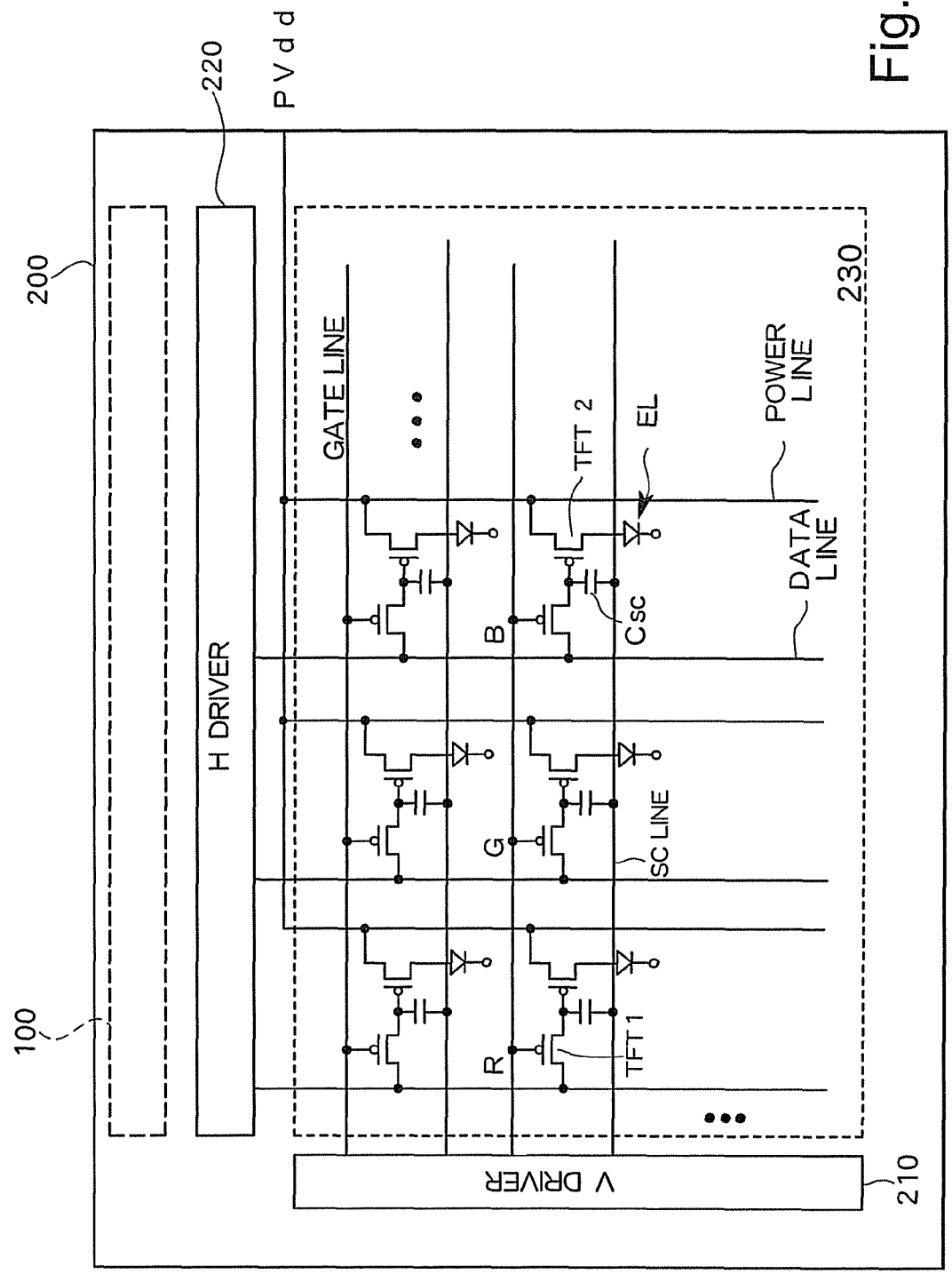
FIG. 5 is a diagram schematically showing another structure of a display apparatus according to a preferred embodiment of the present invention.

In the above description, an LCD is described as an example of the display apparatus, but the present invention is not limited to such a configuration, and, alternatively, the integrated driving apparatus of the present invention can be applied, for example, as a driving circuit for an electroluminescence (EL) display apparatus or the like which uses a self-emissive element such as an organic EL element as a display element, to achieve similar advantages. In particular, the integrated driving apparatus can be used as an integrated driving apparatus to be mounted on the panel 100 for an active matrix EL display apparatus or the like as shown in FIG. 5, in which a self-emissive element (EL in FIG. 5) is provided in each pixel and the element is controlled by pixel TFTs (TFT1 and TFT2 in FIG. 5). In FIG. 5, ON and OFF states of the TFT1 in each pixel are controlled by a gate line, display data is supplied from a data line, and a voltage corresponding to the data is stored in a capacitor Csc. The TFT2 operates according to the stored voltage, a current from a power supply line is supplied to the EL element, the current flows through the EL having a diode structure, and light is emitted. One electrode of the capacitor Csc is connected to a capacitor line and a potential of the electrode is controlled.

What is claimed is:

1. An integrated driving apparatus for a display apparatus having a display section in which a plurality of pixels are arranged in a matrix form on a panel substrate, the integrated driving apparatus comprising:
    a logic section which comprises a digital display data processor which processes digital display data and a timing signal generator which generates a timing control signal necessary for the display apparatus based on a timing signal from outside, and having a logic circuit element;
    a digital-to-analog converter which converts digital display data obtained by the digital display data processor into analog data; and
    a power supply circuit section which generates a power supply voltage used in the display apparatus using a signal from the timing signal generator, wherein
    the integrated driving apparatus has an elongated shape extending along a row direction or a column direction of the display section so that the integrated driving apparatus can be mounted on a peripheral portion of the display section on the panel substrate; and
    the power supply circuit section and the digital-to-analog converter are provided on left and right of the logic section with the logic section therebetween so that the power supply circuit section and the digital-to-analog converter are placed adjacent to the logic section along a long side direction of the elongated shape.

2. The integrated driving apparatus for display apparatus according to claim 1, wherein
    at least a clock line for supplying a power supply clock signal for generating the power supply voltage is provided between the timing signal generator and the power supply circuit section;
    at least a plurality of data lines for supplying the digital display data to the digital-to-analog converter are provided between the digital display data processor and the digital-to-analog converter; and
    the digital display data processor, the timing signal generator, and the digital-to-analog converter operate with a supply of a power supply from an external power supply.

3. The integrated driving apparatus for display apparatus according to claim 2, wherein
    the display apparatus is an active matrix display apparatus having, in each of the plurality of pixels, a transistor element which controls a display element, and
    the analog display data from the digital-to-analog converter is supplied to a data line provided in the display section.

4. The integrated driving apparatus for display apparatus according to claim 1, wherein
    the display apparatus is an active matrix display apparatus having, in each of the plurality of pixels, a transistor element which controls a display element, and
    the analog display data from the digital-to-analog converter is supplied to a data line provided in the display section.

* * * * *